United States Patent [19]

Kato

[11] Patent Number: 5,667,255
[45] Date of Patent: Sep. 16, 1997

[54] JOINT STRUCTURE FOR JOINING A BRANCH MEMBER TO A HIGH PRESSURE FUEL RAIL

[75] Inventor: Nobuo Kato, Shunto-gun, Japan

[73] Assignee: Usui Kokusai Sangyo Kaisha Ltd., Japan

[21] Appl. No.: 495,329

[22] Filed: Jun. 27, 1995

[30] Foreign Application Priority Data

Jun. 28, 1994 [JP] Japan .................................. 6-168788

[51] Int. Cl.$^6$ ...................................................... F16L 41/08
[52] U.S. Cl. .................. 285/133.4; 285/332; 285/334.4; 285/332.1; 285/328
[58] Field of Search ..................................... 285/150, 332, 285/328, 332.1, 334.4, 156

[56] References Cited

U.S. PATENT DOCUMENTS

| | | |
|---|---|---|
| 4,832,376 | 5/1989 | Sugao . |
| 4,893,601 | 1/1990 | Sugao . |
| 4,900,180 | 2/1990 | Takikawa . |
| 5,120,084 | 6/1992 | Hashimoto . |
| 5,143,410 | 9/1992 | Takikawa . |
| 5,169,182 | 12/1992 | Hashimoto . |
| 5,172,939 | 12/1992 | Hashimoto . |

*Primary Examiner*—Terry Lee Melius
*Assistant Examiner*—Heather Shackelford
*Attorney, Agent, or Firm*—Gerald E. Hespos; Anthony J. Casella

[57] ABSTRACT

A joint structure for joining a branch member to a high pressure fuel rail which automatically aligns a spigot head of the branch member, if offset, upon tightening of a bolt and increases the rigidity of the spigot head to provide a sufficient degree of mechanical strength so that the spigot head can positively be "seated", and which insures connection between the branch member and the fuel rail if a fuel under substantially high pressure repeatedly flows over a prolonged period of time and if piping is subject to vibration and is free from leakage. In this joint structure, the branch member includes a spherical spigot end surface at its distal end, an annular flange axially spaced away from the spigot end surface, and a conical surface converging from the annular flange toward the spigot end surface.

5 Claims, 7 Drawing Sheets

5,667,255

JOINT STRUCTURE FOR JOINING A BRANCH MEMBER TO A HIGH PRESSURE FUEL RAIL

BACKGROUND OF THE INVENTION

1. Field of the Invention

The present invention relates to a joint structure for joining a branch pipe, branch adapter or similar members to a high pressure fuel rail such as a high pressure fuel multi-pipe and a block rail and in particular, to a joint structure for joining a branch member to a high pressure fuel rail under a pressure of greater than 1000 kgf/cm$^2$ such as a fuel supply line for use in a diesel internal combustion engine.

2. Description of the Prior Art

A conventional joint structure of this type is disclosed in Japanese laid-open patent publication No. 3-273599 filed by the applicants of this application. Referring specifically to FIG. 11, a branch member or pipe 13 includes an internal passage 13". The branch pipe 13 has a spigot head 13' at its distal end. The spigot head 13' has a spherical surface 14'. The branch pipe 13 has a straight portion (cylindrical wall) 14 provided at its proximal end and connected to the spherical surface 14'. The spigot head 13' has a radius of curvature in the range from 0.4D to 10.0D, where D is the diameter of the branch pipe 13. A high pressure fuel main pipe has tapered bearing surfaces 12'. A lock nut is tightened to secure the branch pipe to the main pipe while the spigot head is abuttingly engaged with each of the bearing surfaces 12'.

The conventional joint structure is satisfactory in the sense that the branch pipe 13 can readily be joined by tightening the lock nut, and if the spigot head 13' of the branch pipe 13 is offset, the spigot head 13' can automatically be aligned and held in linear contact with the spherical bearing surface 12' to insure the connection under even contact pressure as the lock nut is being tightened. However, the straight portion 14 lacks rigidity and is thus subject to deformation or inclination due to repeated supply of fuel under substantially high pressure and vibration. If this occurs, the front end of the passage 13" within the branch pipe 13 is collapsed to reduce its effective cross sectional area and increase the resistance to fuel flow. This blocks precise control of fuel injection. Moreover, the connection can not be maintained over a prolonged period of time due to unstable "seating" of the spigot head and loosening of the lock nut. This results in leakage of the fuel.

SUMMARY OF THE INVENTION

It is an object of the present invention to overcome the problems encountered in the prior art and to provide a joint structure for joining a branch member to a high pressure fuel rail, which automatically aligns a spigot head of the branch member, if offset, upon tightening of a bolt, increases the rigidity of the spigot head to provide a sufficient degree of mechanical strength, and prevents fatigue or permanent deformation, and which positively "seats" the spigot head on a bearing surface, insures connection over a prolonged period of time, and prevents a reduction in the effective cross sectional area of the passage of the branch member.

In order to achieve the foregoing objects, the present invention provides a joint structure for joining a branch member to a high pressure fuel rail, comprising a fuel rail including an axial passage through which a high pressure fuel flows, a plurality of through holes formed in the peripheral wall of the passage and arranged along the axis of the passage, and a bearing surface formed in each of the through holes and diverging toward the peripheral wall of the fuel rail, a branch member including a passage communicated with the passage of the fuel rail through each of the through holes, and a spigot head formed at its one end and placed in abutment engagement with the bearing surface, and a nut mounted to the branch member and tightened to secure the branch member to the fuel rail, wherein the spigot head comprises a spherical spigot end surface, an annular flange axially spaced away from the spigot end surface and contacted with the nut, and a conical surface converging from the annular flange toward the spigot end surface. Further, an annular boundary line is provided between the conical surface and the spherical spigot end surface and is urged into abutment engagement with the bearing surface.

According to the present invention, the spigot head is provided at one end of the branch member, and the spherical spigot end surface is formed in the distal end of the spigot head. With this arrangement, the spherical spigot end surface is held in linear contact with the spherical bearing surface to maintain even contact pressure and provide a better seal between the spigot end surface and the bearing surface if the branch member is slightly inclined relative to a fuel rail during assembly.

If the branch member is slightly offset or inclined, the spherical spigot end surface is slid on the spherical bearing surface to automatically align the branch member before the contact pressure of a sealing surface increases when the lock nut is tightened. This results in even contact pressure between spigot end surface and the bearing surface.

The spigot head comprises a spherical spigot end surface, an annular flange axially spaced away from the spigot end surface, and a conical surface having a high rigidity and converging from the annular surface toward the spigot end surface. This arrangement provides a higher mechanical strength to prevent deformation or inclination of the spigot head and positively "seat" the spigot head, and also prevents a reduction in the effective cross sectional area of the passage of the branch member to insure uniform flow and a rise in the resistance to fuel flow to enable precise control of fuel injection.

The branch member can easily be secured to a fuel rail by bringing the spigot head of the branch member into abutment engagement with the bearing surface and then, tightening the nut. A branch fitting may have a thread on its outer periphery, and a cap nut may be threaded over the branch fitting.

BRIEF DESCRIPTION OF THE DRAWINGS

FIG. 6 is a partial sectional view, on an enlarged scale, showing the manner of contact under pressure according to the present invention.

FIG. 8 shows a further embodiment of the present invention.

DETAILED DESCRIPTION OF PREFERRED EMBODIMENTS

The present invention will now be described by way of example with reference to the accompanying drawings.

Figure 1:
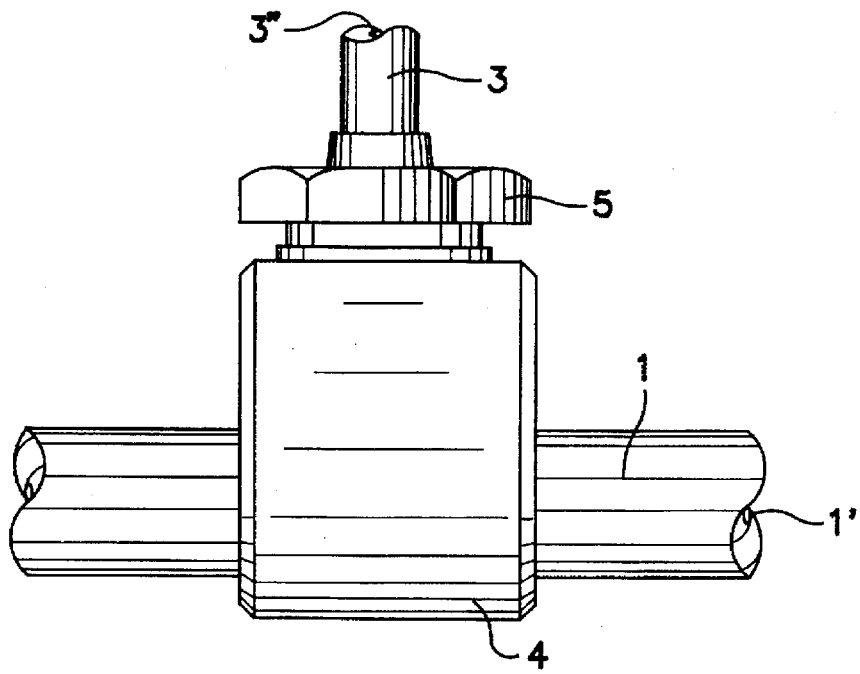
FIG. 1 is a front view of one embodiment of the present invention.
Figure 2:
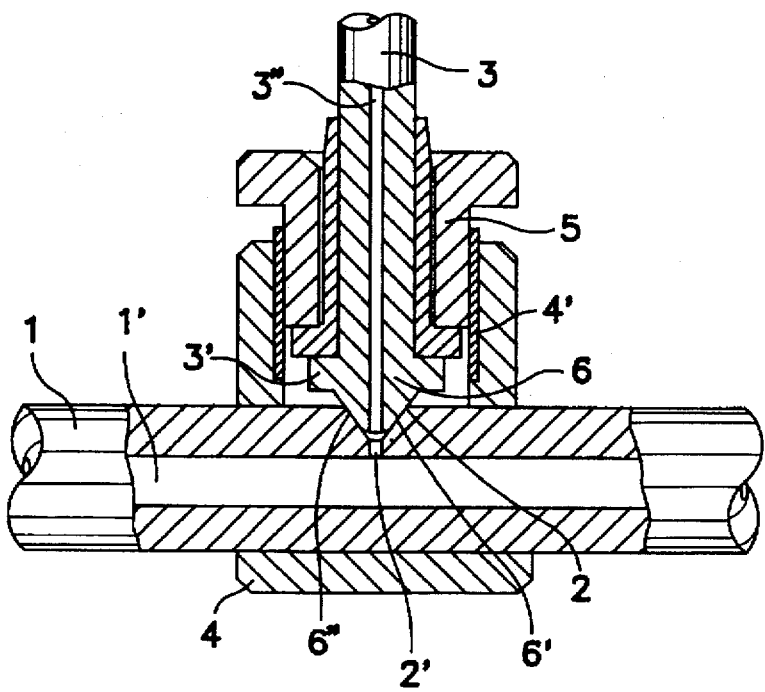
FIG. 2 is a front view, partly in section, of the embodiment shown in FIG. 1.

As shown in FIG. 1, a branch member or pipe 3 extends perpendicular to the axis of a main pipe 1 as a fuel rail. The branch pipe 3 is secured to the main pipe 1 by a lock nut 5 at a location where a branch fitting 4 surrounds the main pipe 1. As shown in FIG. 2, the main pipe 1 has an outer diameter of 20 mm and is relatively thick, for example 6 mm. The main pipe 1 is made of metal and includes a passage 1'. A through hole 2' is communicated with the passage 1'. The through hole 2' diverges toward the outer periphery of the main pipe 1 and has a bearing surface 2 at its one end. The bearing surface 2 is formed about the axis of the through hole 2' and has a conical, arcuate, ellipsoidal, parabolic, hyperbola or other shape.

The branch fitting 4 is mounted to the main pipe 1 and surrounds the bearing surface 2. The branch fitting 4 has a threaded hole 4'.

Figure 3:
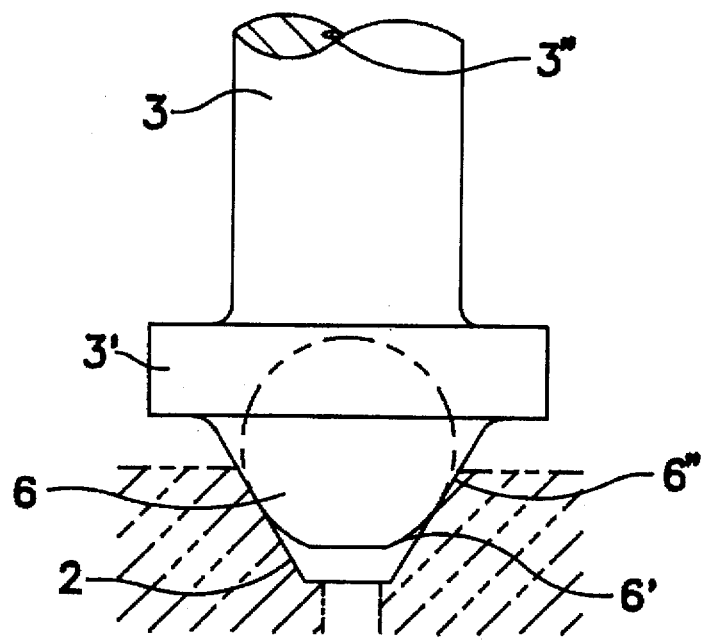
FIG. 3 is a view showing the principal part of the embodiment of the present invention.

The branch pipe 3 has a spigot head 6 at its one end. As shown in FIG. 3, the spigot head 6 has a spherical spigot end surface 6' at its distal end, and a radially extending annular flange 3' axially spaced away from the spigot end surface 6'. A conical surface 6"" is connected between the spigot end surface 6' and the annular flange 3' and converges toward the spigot end surface 6'. The conical surface 6"" extends in a direction tangentially of the spherical spigot end surface 6'.

Figure 4:
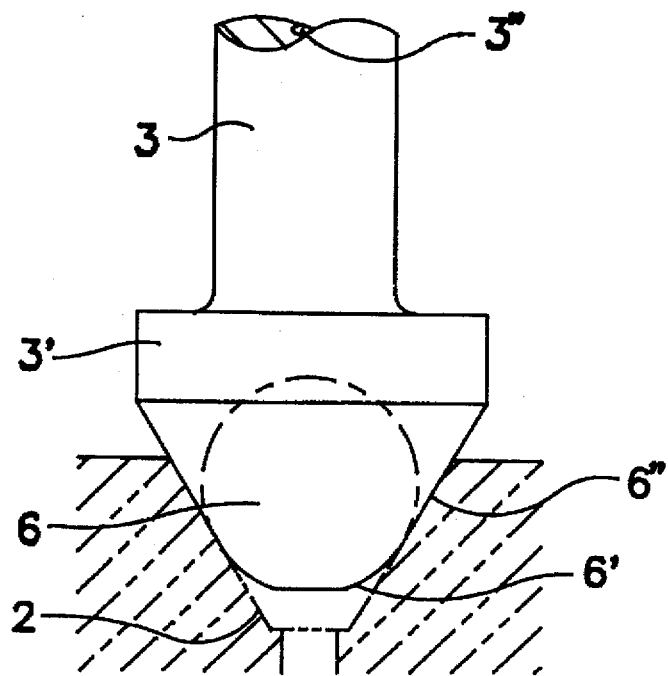
FIG. 4 is a view similar to FIG. 3, but showing another embodiment.

As shown in FIG. 4, the annular flange 3' may extend vertically upwardly, rather than radially, from the conical surface 6"".

Figure 5:
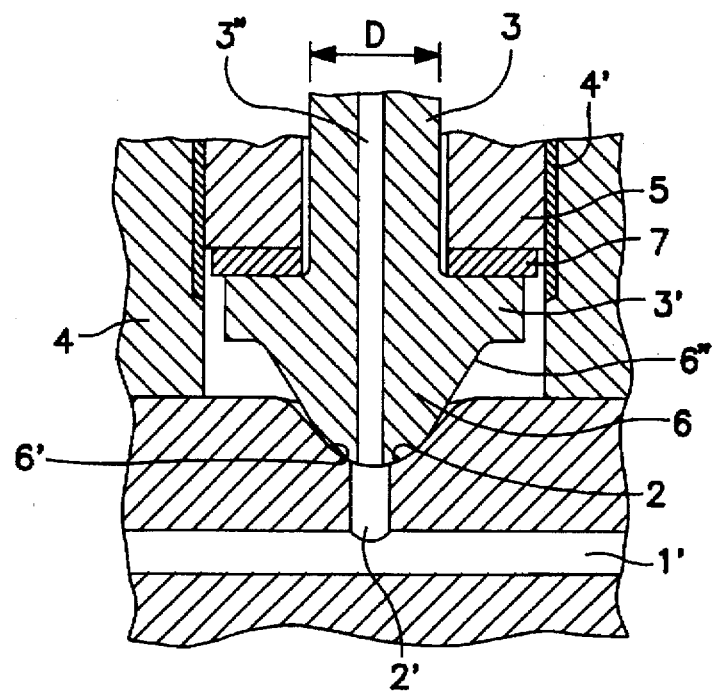
FIG. 5 illustrates the structure of the present invention.

In the embodiment shown in FIG. 5, the spigot end surface 6' has the following radius of curvature γ, as in Japanese laid-open patent publication No. 3-273599:

$$0.4D \leq \gamma \leq 10D \quad (1)$$

where D is the diameter of the branch pipe 3. If the radius of curvature γ is less than two fifths the diameter D of the branch pipe 3, a torque, which is generated when the lock nut 5 is tightened, causes the spigot end surface 6' to enter the passage 1' through the bearing surface 2. If, on the other hand, the radius of curvature γ is greater than ten times the diameter of the branch pipe 3, the spigot end surface 6' is deformed to a cylindrical or conical shape. If this occurs, the spigot head 6 in no way enjoys self-alignment which is possible in the event that the spigot head has a spherical end, as will be described later. Preferably, the radius of curvature γ is equal to or less than two fifths the diameter D and equal to or greater than four times the diameter D ($0.4D \leq \gamma \leq 4D$).

Figure 6A:
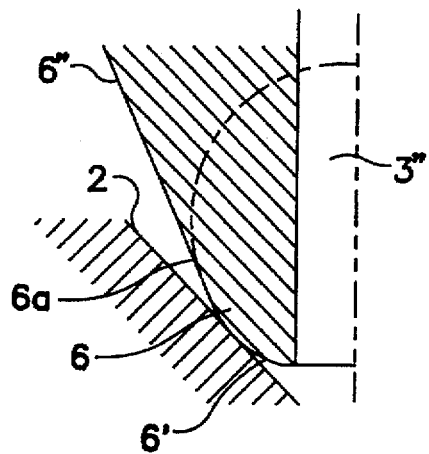
FIG. 6(a) is a view showing the manner in which a spigot end surface is pressed against the bearing surface.
Figure 6B:
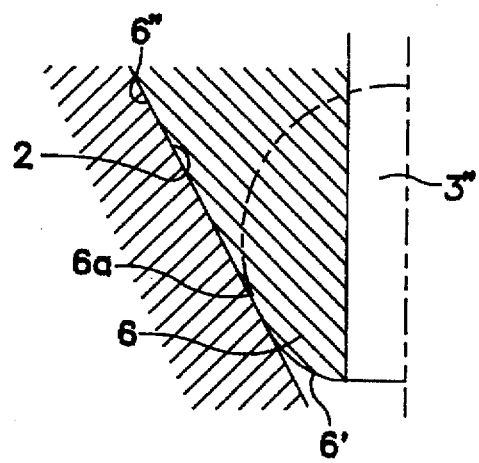
FIG. 6(b) is a view showing the manner in which a conical surface is pressed against the bearing surface.
Figure 6C:
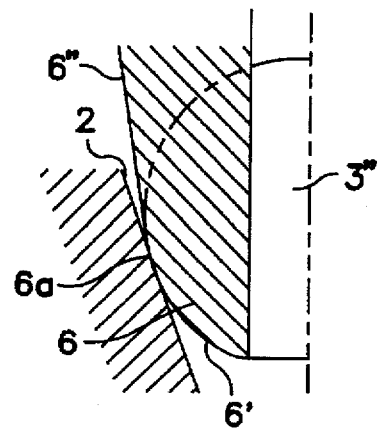
FIG. 6(c) is a view showing the manner in which an annular boundary line between the spigot end surface and the conical surface is pressed against the bearing surface.

While the spigot end surface 6' of the spigot head 6 in the branch pipe 3 is in contact with the bearing surface 2, the lock nut 5 is threaded into the threaded hole 4' to secure the branch member 3 to the main pipe 1. As the front end of the lock nut 5 urges the annular flange 3' through a washer 7 if provided, the spigot end surface 6' is pressed against the bearing surface 2 as shown in FIG. 6(a), or the conical surface 6" is pressed against the bearing surface 2 as shown in FIG. 6(b). Also, as shown in FIG. 6(c), an annular boundary line 6a between the spigot end surface 6' and the conical surface 6" may be strongly forced into abutment with the bearing surface 2. This abutment provides a hermetical connection between the passage 1' of the main pipe 1 and the passage 3" of the branch pipe 3. In other words, the bearing surface 2 is located between the conical surface 6' of the spigot head 6 and an imaginary plane extending tangentially of the spherical spigot end surface 6'.

The annular boundary line 6a projects from the spigot head as viewed microscopically in section. Contact pressure between the annular boundary line 6a and the bearing surface 2 is increased to provide a better seal when the annular boundary line 6a is forced against the bearing surface 2.

In the foregoing embodiments, the spigot head 6 is urged into direct abutment engagement with the bearing surface 2. Alternatively, a seal member may be disposed between the spigot head 6 and the bearing surface 2 and made of indium, silver, copper, brass, aluminum or other materials.

Figure 7:
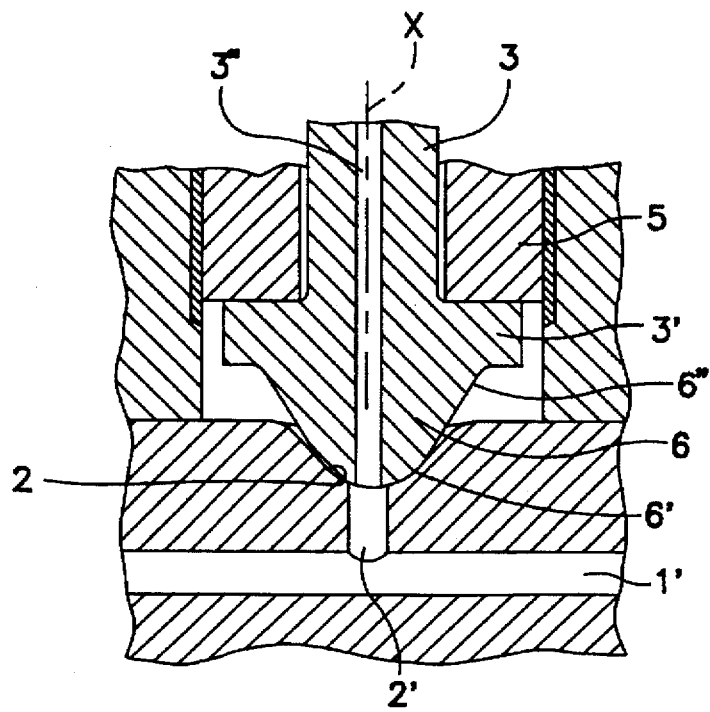
FIG. 7 illustrates the operation of the present invention.

Next, in these embodiments, the spigot head 6 is held in linear contact with the spherical bearing surface 2 to properly position the branch pipe 3 relative to the main pipe 1 in a constant manner and maintain even contact pressure between the spigot head 6 and the bearing surface 2 even if the branch pipe 3 is slightly offset or inclined from an axis X during assembly. If, for some reasons, the branch pipe 3 is slightly offset or inclined from the axis X as shown in FIG. 7, the spherical surface of the spigot head 6 is slid on the spherical bearing surface 2 before the contact pressure between the spigot head 6 and the bearing surface 2 is increased as the lock nut 5 is tightened to develop a torque. As a result, the branch pipe 3 is moved from its offset or inclined position to a predetermined position (self-alignment) to maintain the sealing surface under even contact pressure and prevent leakage of a fuel. This insures supply of fuel under substantially high pressure.

As the spigot end surface 6' of the spigot head 6 is spherical in shape, the spigot end surface 6' is held in linear contact with the spherical bearing surface 2. This linear contact maintains a seal between the spigot head 6 and the bearing surface 2 and corrects the inclination of the branch pipe 3 with self-alignment capability, as described earlier, if the branch pipe 3 is slightly offset or inclined. No leakage of fuel results.

As far as the radius of curvature γ of the spigot end surface 6' of the spigot head 6 is within the range as indicated by the relationship (1), the spigot head 6 is held in contact with the bearing surface 2 in an optimal manner to provide a safe and complete seal.

Figure 8A:
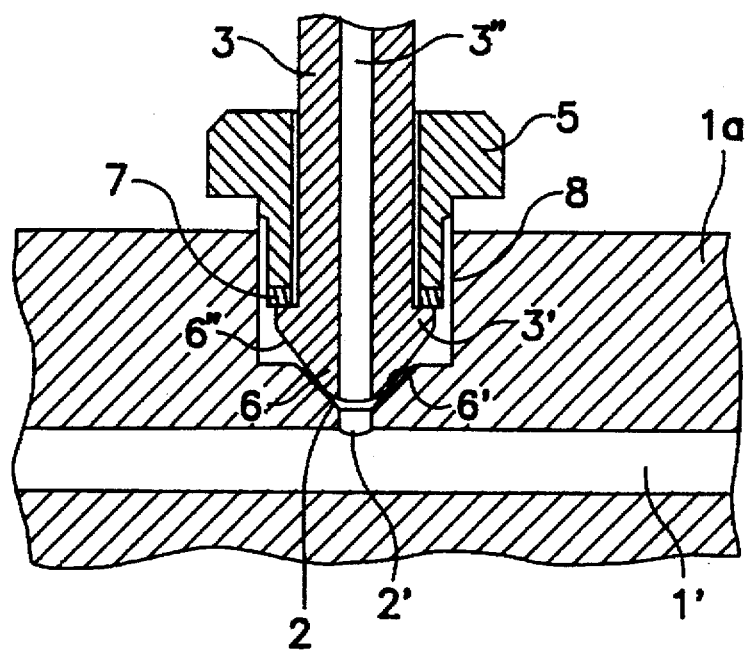
FIG. 8(a) is a view similar to FIG. 2.
Figure 8B:
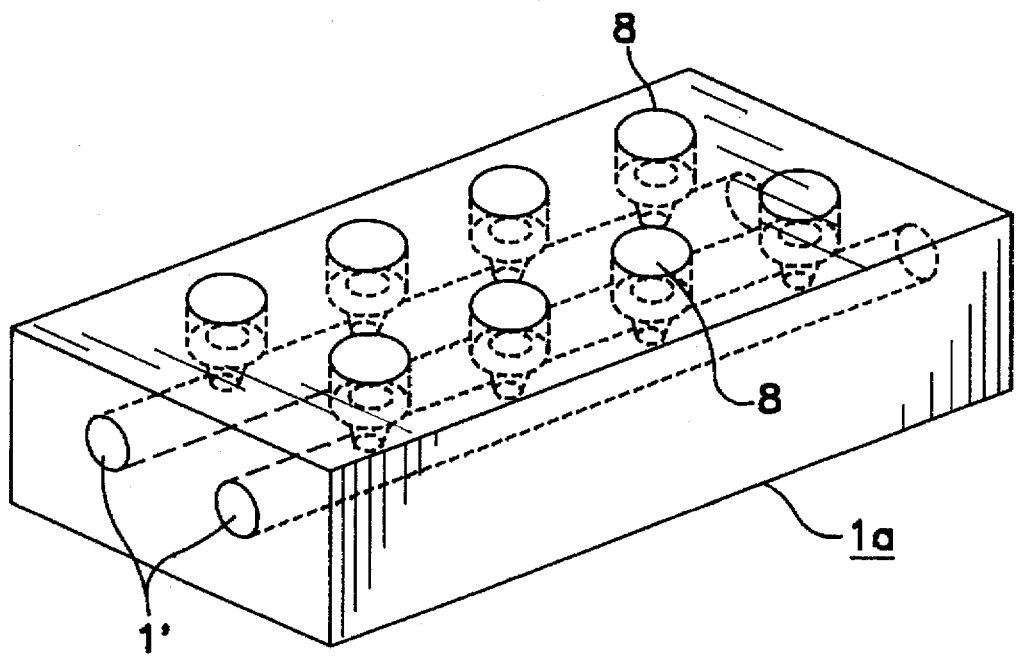
FIG. 8(b) is a perspective view of a block rail shown in FIG. 8(a)

In the foregoing embodiments, the branch fitting 4 is mounted to the main pipe 1 to surround the bearing surface 2. In lieu of the main pipe 1, the present invention is also applicable to a block rail 1a, as a fuel rail, as shown in FIG. 8(b). The embodiment shown in FIG. 8 eliminates the need for the branch fitting 4. The passage 1' extends eccentrically through the block rail 1a. The through hole 2', bearing surface 2 and threaded hole 8 are formed in the thick wall of the block rail 1a. The through hole 2' is communicated with the passage 1'. The lock nut 5 is threaded directly into the threaded hole 8 and connected to the branch pipe 3 through the washer 7.

Figure 9:
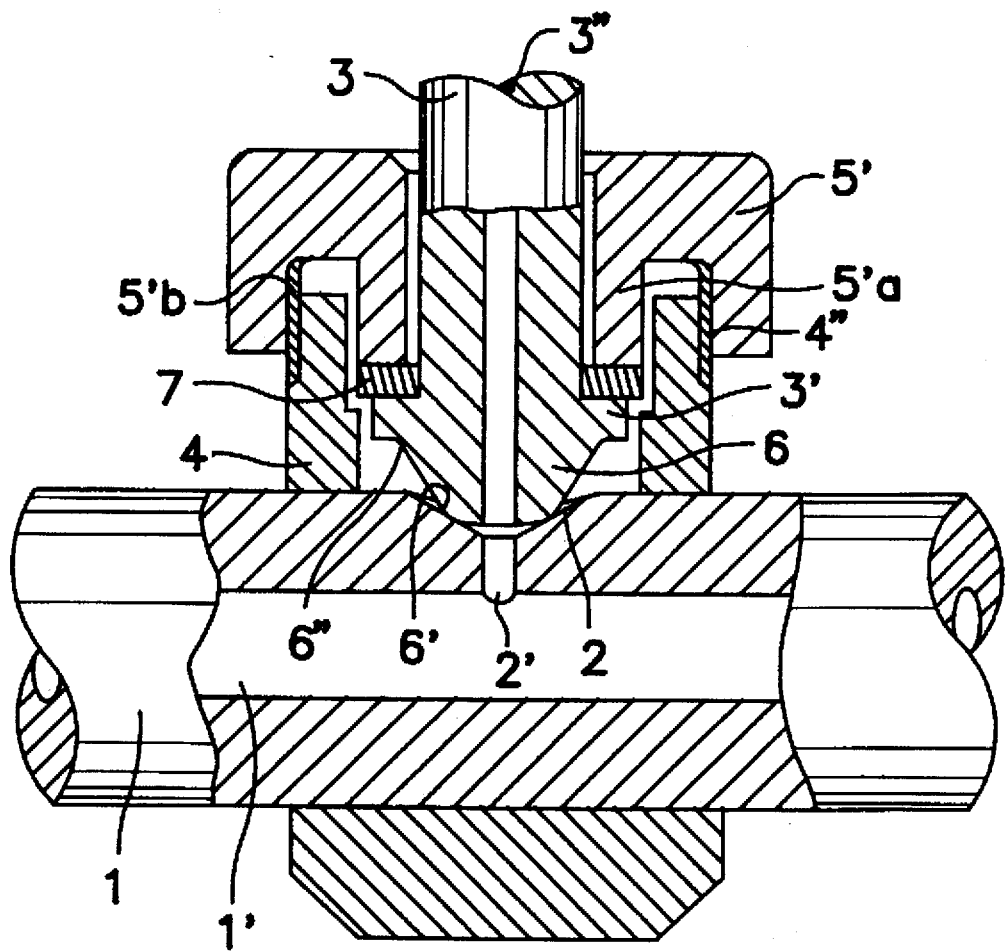
FIG. 9 is a view similar to FIG. 2, but showing another embodiment.

FIG. 9 illustrates a cap nut 5' for use in the present invention. The cap nut 5' includes a central cylindrical projection 5'a. The cap nut 5' has a thread 5'b on its inner periphery. The branch fitting 4 has a thread 4" on its outer periphery. The thread 5'b of the cap nut 5' is threadedly engaged with the thread 4" of the branch fitting 4 to cause the projection 5'a to downwardly urge the annular flange 3' through the washer 7. The spigot head 6 is then brought into abutment engagement with the bearing surface 2.

Figure 10:
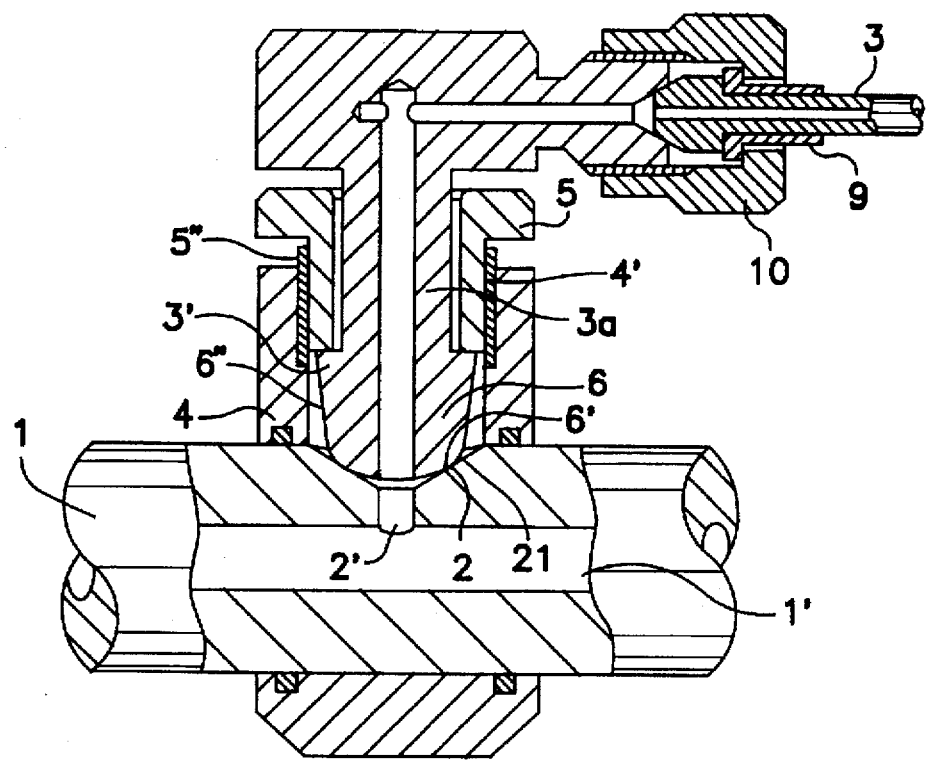
FIG. 10 is a view similar to FIG. 2, but showing a further embodiment.
Figure 11:
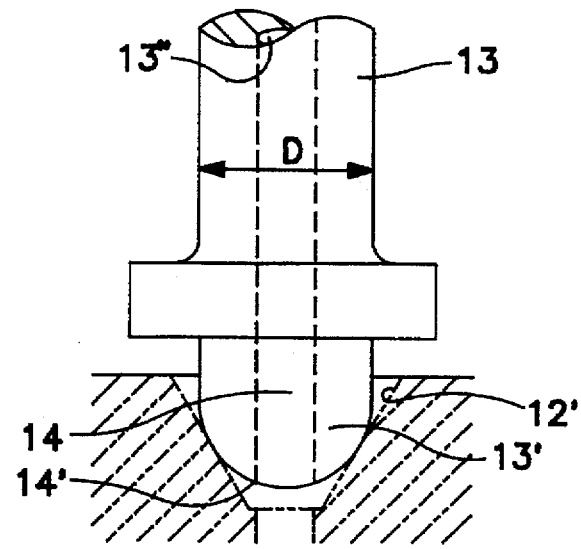
FIG. 11 is a view showing the principal part of a conventional joint structure for joining a branch member to a high pressure fuel rail.

FIG. 10 is a vertical sectional view showing the principal part of another embodiment. In this embodiment, a branch adapter 3a is substituted for the branch pipe 3 and acts as a branch member. This embodiment enables the use of an elbow or similar branch adapters, or a branch adapter within which a two-way delivery valve, a damping valve, a deliver valve, a discharge valve and other mechanisms are incorporated and prevents interference with other components which may occur when a branch member is bent with a large radius of curvature.

In the embodiment shown in FIG. 10, the branch adapter 3a includes the spigot head 6, spherical spigot end surface 6', annular flange 3' and conical surface 6" extending between the spigot end surface 6' and the annular flange 3' as in the previous embodiment. The lock nut 5 has a thread 5" on its outer periphery. The branch fitting 4 has a threaded hole 4'. The thread 5" of the lock nut 5 is threaded into the threaded hole 4' of the branch fitting 4 so as to force the spigot head 6 of the branch adapter 3a into abutment engagement with the bearing surface 2 of the main pipe 1 through the annular flange 3'. A cap nut 10 is threaded over the other end of the branch adapter 4 through a sleeve 9. This completes connection of the branch pipe 3.

This embodiment enables the branch pipe 3 to extend parallel to the longitudinal axis of the main pipe 1.

As thus far described, the present invention provides a joint structure for joining a branch member to a high pressure fuel rail, wherein the spigot head is held in linear contact with the spherical bearing surface to maintain even contact pressure if the branch member is mounted in an inclined fashion due to the spherical surface of the spigot end surface, and wherein if the branch member is offset or inclined, the spherical spigot end surface is slid on the spherical bearing surface to automatically align the branch member so as to maintain even contact pressure before the contact pressure of the sealing surface increases when the lock nut is tightened to develop a torque. Additionally, the joint structure enables ready coupling of the branch member to the fuel rail in an air-tight manner, increases the rigidity of the conical surface to prevent fatigue or permanent deformation, positively "seats" the spigot head on the bearing surface, inhibits scattering or leakage of a fuel due to repeated application of substantially high pressure or vibration of a diesel internal combustion engine and separation of the connection, prevents a reduction in the effective cross sectional area of the passage of the branch member to insure uniform flow, and prevents an increase in the resistance to fuel flow to promote smooth fuel flow and enable precise control of fuel injection.

I claim:

1. A joint structure for joining a branch member to a high pressure fuel rail, comprising a fuel rail with a peripheral wall having an axial passage through which a high pressure fuel flows, at least one through hole formed in the peripheral wall of said passage, said through hole being defined by an outwardly diverging bearing surface formed on the peripheral wall of said fuel rail, a branch member including a passage communicating with said passage of said fuel rail through said through hole, a spigot head formed at one end of said branch member and placed in abutting engagement with the bearing surface, and a nut mounted around said branch member, said branch member being secured to said fuel rail by tightening said nut, wherein said spigot head comprises a spherical spigot end surface, an annular flange axially spaced away from said spherical spigot end surface and in contact with said nut, and a conical surface having large and small diameter ends, said large diameter end being at said annular flange, said small diameter end of said conical surface being tangential to said spherical spigot end surface at an annular line of tangency, said annular line of tangency being urged into abutting engagement with said bearing surface, whereby said conical surface increases rigidity of said spigot head for preventing fatigue and deformation.

2. A joint structure according to claim 1, wherein said high pressure fuel rail is a high pressure multi-pipe or a block rail.

3. A joint structure according to claim 1, wherein said branch member is a branch pipe or branch adapter.

4. A joint structure according to claim 1, wherein said bearing surface is located between said conical surface of said spigot head and an imaginary surface extending tangentially of the spherical surface of said spigot end surface.

5. A joint structure according to claim 1, wherein said bearing surface is formed about the axis of each of said through holes and has a conical shape.

* * * * *